(12) United States Patent
Grace et al.

(10) Patent No.: US 9,784,523 B2
(45) Date of Patent: Oct. 10, 2017

(54) HYBRID PROPELLANT ELECTROMAGNETIC GUN SYSTEM

(71) Applicant: ENIG ASSOCIATES INC., Bethesda, MD (US)

(72) Inventors: Fred Irvin Grace, York, PA (US); Kim Yilbong, Silver Spring, MD (US); Eric N. Enig, Bethesda, MD (US); Daniel Bentz, Derwood, MD (US); Michael J. Barnard, Laurel, MD (US)

(73) Assignee: Enig Associates Inc., Bethesda, MD (US)

(*) Notice: Subject to any disclaimer, the term of this patent is extended or adjusted under 35 U.S.C. 154(b) by 0 days.

(21) Appl. No.: 15/106,360

(22) PCT Filed: Dec. 19, 2014

(86) PCT No.: PCT/US2014/071488
§ 371 (c)(1),
(2) Date: Jun. 20, 2016

(87) PCT Pub. No.: WO2015/147927
PCT Pub. Date: Oct. 1, 2015

(65) Prior Publication Data
US 2016/0341514 A1    Nov. 24, 2016

Related U.S. Application Data

(60) Provisional application No. 61/918,257, filed on Dec. 19, 2013, provisional application No. 62/001,914, filed on May 22, 2014.

(51) Int. Cl.
*F41B 6/00* (2006.01)
*F41A 1/02* (2006.01)
*H02K 3/28* (2006.01)
*H02K 5/02* (2006.01)
*H02K 7/02* (2006.01)
(Continued)

(52) U.S. Cl.
CPC ............ *F41B 6/003* (2013.01); *F41A 1/02* (2013.01); *H02K 3/28* (2013.01); *H02K 5/02* (2013.01); *H02K 7/025* (2013.01); *H02K 9/04* (2013.01); *H02K 41/0356* (2013.01)

(58) Field of Classification Search
USPC .................. 89/8, 1.41; 124/3; 310/12.07
See application file for complete search history.

(56) References Cited

U.S. PATENT DOCUMENTS

| 634,826 A | * | 10/1899 | Masini | ............ F42B 5/03 102/438 |
| 920,709 A | | 5/1909 | Alderman | |
| 2,870,675 A | | 1/1959 | Salisbury | |

(Continued)

FOREIGN PATENT DOCUMENTS

IT    MI912994 A1    5/1993

*Primary Examiner* — J. Woodrow Eldred
(74) *Attorney, Agent, or Firm* — Browdy and Neimark, P.L.L.C.

(57) ABSTRACT

A hybrid gun device composed of two barrels (1,10) that accept energy from combustion of standard propellant (6), one barrel (10) being operative to produce a high intensity electric current to add accelerating energy to a projectile (7) in the second barrel (1) and at least one coil (8) stage to convert energy between electrical and kinetic to cause the projectile (7) to be launched at hypervelocity.

18 Claims, 7 Drawing Sheets

(51) Int. Cl.
*H02K 9/04* (2006.01)
*H02K 41/035* (2006.01)

(56) References Cited

U.S. PATENT DOCUMENTS

| | | | |
|---|---|---|---|
| 4,966,884 A | 10/1990 | Hilal | |
| 4,996,903 A | 3/1991 | Arakaki | |
| 6,668,699 B2 * | 12/2003 | Russell | F41A 1/00 89/14.05 |
| 7,503,249 B2 * | 3/2009 | Jackson | F41B 6/006 124/3 |

* cited by examiner

HYBRID PROPELLANT ELECTROMAGNETIC GUN SYSTEM

BACKGROUND OF THE INVENTION

The present invention relates to conventional guns that use propellant energy in combination with electromagnetic energy in a coil system that acts to launch projectile mass in the hypervelocity regime. Electromagnetic coil gun projectile launch systems are already known in the art. An example thereof is disclosed in: "Design and Performance of Sandia's Contactless Coilgun for 50 mm Projectiles," IEEE Transactions on Magnetics, Vol. 29, No 1, p. 680, January 1993, R. J. Kaye et al and the entirety of which is incorporated herein by reference. An integrated propellant and coil gun system is disclosed in: "Hypervelocity Projectile Launching System," U.S. patent application Ser. No. 13/916,176, 14 Jun. 2013, F. I. Grace et al, and the entirety of which is incorporated herein by reference.

It is known that extremely high magnetic fields can be obtained using high current levels that are passed through helically wire-wound coils. When a moving ferromagnetic or metallic material mass interacts with these magnetic fields, the mass is subjected to extremely high Lorentz forces. Such devices that employ these interactive forces are known as electromagnetic coilguns or launchers. In such coilgun, interaction of a metallic mass with an established magnetic field within the coil accelerates that mass. When the coil is energized with electrical current passing through its wires, the field induces a current within the metallic mass that in turn develops a magnetic field about the mass. Both coils and metallic mass have associated inductances. Inductance of the coil is proportional to the number of turns of wire in its windings, while that of the metallic mass corresponds to a single turn. There is also an established mutual inductance associated with the presence of both magnetic field-generating elements. The change in inductance as the interaction takes place and heat losses in the process establish the efficiency at which electrical energy is converted into mechanical or kinetic energy of the accelerated mass.

The force on the mass is described by J×B, which is the cross product of the current density vector J and magnetic field intensity vector B. When the coil is fixed in space, and an electrically conductive mass is initially placed at rest in close proximity to the coil, the mass may be accelerated either away from or towards the coil, depending on the sign of the changing electrical current in the coil. If the mass initially has a velocity, then the direction of current can either further accelerate the mass acting as an armature to greater velocity or alternately can retard the motion of the mass. Consequently, the coil system can act as an accelerator of mass being a linear electrical motor or a brake. The accelerating system converts electrical energy into kinetic energy whereas the decelerating system converts kinetic energy into electrical energy. Generally, a single coil having single or multiple windings is insufficient to provide large enough acceleration so several such coils are laid end to end along a central axis to compose a series of coil stages. By using a large number of coil stages the mass can be accelerated to very high velocity provided sufficient external electrical energy can be supplied to the coil stages. One example of a coil arrangement that can be employed in devices according to the invention is disclosed in the referenced Sandia article on coilguns. In addition, a large number of coil stages in the deceleration system could be used to reduce the initial velocity of the metallic mass to virtually zero.

Conventional propellants are routinely used to accelerate a projectile mass within a gun barrel [Army (February 1965), Interior Ballistics of Guns, Engineering Design Handbook: Ballistics Series, United States Army Material Command, AMCP 706-150, incorporated herein by reference]. The conversion mechanism and efficiency of chemical energy supplied by the propellant to projectile kinetic energy is well understood. There is an upper limit of velocity to which a projectile mass can be accelerated. Final velocity was limited by projectile mass, propellant mass, barrel length and the ability of the breech and barrel to withstand internal pressure from propellant combustion. Further, muzzle velocity is limited by the sound speed of the propellant gases that cause projectile acceleration. Since helium has higher sound speed than combustion gases, guns have been built wherein propellant combustion pressurizes a mass of helium and the pressurized helium accelerates the projectile. [Wikipedia.org/wiki/light_gas_gun: Light Gas Gun: Design Physics, 2013, incorporated herein by reference.]. Regardless of the amount of propellant used, type of gas used, barrel strength or length, or diminishing projectile mass, projectile velocity exiting the muzzle is limited in the prior art. With such limitation, gun design efficiency diminishes correspondingly as the theoretical limit is approached, i.e., progressively more propellant energy is wasted. These limits associated with the ability to produce higher projectile muzzle velocity have impeded advances in modern gun technology with regard to improvements in range, accuracy, hits against highly maneuvering targets, and lethality.

Electromagnetic launch of projectiles is not limited by the sound speed of gaseous products. Projectile velocity is limited by air resistance acting on the projectile in the barrel, maximum force that the coils can apply given the maximum currents supported by the projectile, and maximum magnetic fields that can be generated by the coils. Since anticipated projectile velocities, perhaps as high as 4 to 5 kilometers per second are far below these limiting factors, and since electromagnetic launch does not involve gases, there is no limiting factor for the cited velocity ranges of interest.

Projectile acceleration by a coil gun using single or multiple coils has been examined mainly to produce gun systems that do not rely on propellants. [Army Times: EM technology could revolutionize the mortar, 2011, incorporated herein by reference]. Launching a projectile mass from rest to the hypervelocity range requires a very large supply of electrical energy. The energy has to be delivered to the system within tens of milliseconds, which is commensurate with the length of the launch system and the time required for the projectile to traverse that length. The power source is external and massive while fast acting and relatively massive switching devices are required. The higher performing coilguns contain multiple coils that require additional fast acting switches as the projectile passes from one coil to another. An advantage over rail gun is that little friction, if any, is present between the projectile and the coil unlike the sliding and erosion prone electrical contacts used in railgun launch techniques. Power sources used are heavy magnetically braked rotating machinery and large capacitor banks that occupy large volumes of space. Such power sources cannot be easily accommodated by weapon platforms such as howitzers, tank-fired guns, or other smaller guns that require improvements.

BRIEF SUMMARY OF THE INVENTION

The present invention uses a combination of conventional propellant projectile launch and electromagnetic energy to boost the projectile to very high velocity. In the process, additional energy is supplied to the system by expending additional propellant. The electromagnetic energy is obtained by converting chemical energy from the additional propellant to kinetic energy and subsequently converting that kinetic energy to electromagnetic energy using a system of decelerating coils. The electromagnetic energy is then reapplied to a series of accelerating coils to boost the projectile from the velocity provided by the propellant to much higher velocity. Such a system for accelerating projectiles has an advantage in that it uses available propellant as a compact power source, undue large exterior power sources are not required, and the energy is delivered in the appropriate time frame of projectile launch.

The approach of the present invention uses two parallel barrels: an auxiliary barrel generates electrical current while a main barrel accelerates the projectile. The main barrel contains a projectile mass and the auxiliary barrel contains a driver mass. The breech of the auxiliary chamber is connected to the breech of the main barrel through an internal orifice, thus ignition of propellant in the main barrel breech forces high-pressure combustion gases into the auxiliary barrel. Both driver and projectile are accelerated down their respective barrels simultaneously to velocities commensurate with propellant launch. Coil stages along the length of the auxiliary barrel are used to decelerate the driver to produce electrical energy. That energy is applied to coil stages along the main barrel length that act on the moving projectile to further accelerate the projectile into the hypervelocity range.

In addition, the coils decelerating the driver along the auxiliary barrel are electrically charged initially with a relatively small "seed" current on the order of one kilo-Ampere. The seed current energy source is many orders of magnitude lower than the subsequent energy generated by coils arresting the driver mass. Thus, the volume of a power module that would provide needed seed current could be relatively small, allowing for a compact, low-energy external power source. The change in inductance as the driver enters the coils gives rise to current amplification into the 100 kilo-Ampere range. Each coil stage used to decelerate the driver mass puts out a corresponding electrical pulse at about 100 kilo-Ampere current levels so that a series of such electrical pulses are produced. These pulses are applied to the coils along the main barrel to further accelerate the projectile. A switching network is used to properly time events so that the generated high-energy electrical pulses are applied sequentially to the coils along the barrel giving the projectile a timed set of forces to accelerate it to higher velocity. Each coil acts to accelerate the projectile incrementally so that any desired total velocity increase can be obtained by using a sufficient number of coil stages.

The current flowing through the final coil or several final coils is adjusted so that the final increment of velocity imparted to the projectile can be varied. Thus, such adjustment provides a means to change the projectile's muzzle velocity to bring it closed to the desired value. This procedure removes the large amount of muzzle velocity variation from shot to shot, which plagues conventional gun systems. Such means will contribute to consistent projectile launch and flight and provide greater accuracy of projectiles with respect to range.

Since efficiency of coils in converting electrical energy into mechanical energy and vice versa is not 100 percent, significant Joule heating within the coils can arise. The heat raises the temperature of the wires within the coils and the surrounding structure in which the coils are embedded. Gun systems are often required to operate under rapid-fire conditions, where repeated Joule heating of the coils might present undesired temperatures. Thus, the rate at which the gun may be fired depends on the efficiency of the cooling system and therefore imposes a limit on the number of shots that can be fired within a given time. Several means for mitigating temperature as related to the invention hereof is disclosed in: M Floyd, et al, "Thermal management of a propulsion circuit in an electromagnetic munition launcher," U.S. Pat. No. 8,677,878 B1, March 2014, incorporated herein by reference. In addition, forced air-cooling or liquid techniques could be used to reduce the thermal issue. With respect to the thermal issue, the invention has an advantage since the projectile travel within the coil stages is frictionless, unlike the friction and rail ablation that takes place when projectiles are fired from a railgun. Further, the projectile spends less time under the influence of current since it is moving and therefore less Joule heating results than in coilguns that accelerate the projectile from rest.

The present invention of an integrated hybrid propellant and electromagnetic coil gun will have recoil associated with the launch of two masses, but beyond that, momentum exchange of driver during deceleration will nearly offset the momentum change when the projectile is boosted to higher velocity. An advantage of the present invention is that the hybrid gun can launch projectiles of large or standard mass into the hypervelocity range.

The firing of conventional propellant guns produces a large flash of light and high blast overpressure just as the projectile exits the muzzle. These aspects have consequences in terms of a signature that can give away the position of the gun and hazardous hearing and lung response to such high levels of blast. Past approaches to increase projectile velocity by some 10 to 15 percent by propellant guns have used extended barrel length, used more propellant, and used more energetic propellant. While the projectile is accelerated at a higher rate leading to higher muzzle velocity, large amounts of burning propellant are ejected at the muzzle. Thus, greater intensity and duration of flash occurs and higher blast pressure exits the gun. Modern guns often are less efficient, have higher flash signatures, and create far more hazardous blast environments for the gun crew. The present invention provides means to reduce both effects. The first means is that higher projectile velocity is obtained using electromagnetic energy rather than more propellant and more energetic propellants, although such propellant could be used. A second means comes from release of combustion gaseous by venting them to the gun exterior after the projectile has been fully accelerated by combustion pressures but before the projectile enters the acceleration coils. The blast is reduced initially from use of less propellant and venting reduces high-pressure blast that exits the gun barrel muzzle. Muzzle flash is reduced since less burning propellant is ejected at the muzzle.

An advantage of the present invention is that electrical energy is used to boost the projectile from a given velocity to higher velocity rather than accelerating the projectile from an initial rest position. The referenced Sandia National Laboratory's coilgun accelerates a 50 mm diameter projectile of 247 grams from rest to 314 meter per second while designs have been put in place to obtain 1000 meter per second. The present invention, for example, accelerates the projectile to 1400 meters per second using standard propellants and uses electrical energy to boost the projectile velocity from 1400 meters per second to a velocity of the order of 2400 meters per second. Accelerating a moving projectile reduces the time that the projectile spends under the influence of each coil stage, which reduces Joule heating and provides higher overall efficiency in converting electrical energy to kinetic energy. Assume a 10 kilogram projectile and a 40 kilogram driver mass are accelerated by propellant to 1400 meters per second. Then the projectile is boosted from its initial velocity of 1400 to 2400 meters per second, for example, using 19 megaJoules of electrical energy. The driver initially has 39 megaJoules of energy at 1400 meters per second and gives up this energy when brought to zero velocity. Then with decelerator and accelerator systems having 0.7 conversion efficiencies for an overall combined electromagnetic energy conversion efficiency of 0.5, there are 19.5 megaJoules of energy available to further accelerate the projectile to 2400 meters per second.

In the past, coil guns have been designed, built, and tested. The most notable groups examining coil guns include Sandia National Laboratory in Albuquerque, N. Mex., as disclosed in: "SLINGSHOT—A Coilgun Design Code," Sandia National Laboratories Report, SAND2001-1780, B, M, Marder, 2001. Sandia National Laboratory also has contrasted the merits of coilgun and railgun for launching mortars as disclosed in: "EM Mortar Technology Development for Indirect Fire," SAND ADA481646, B. N. Thurman et al, 1 Nov. 2006.

Notable patents pertaining to coil gun devices with multiple stages include U.S. patent application Ser. No. 13/916,176, F. I. Grace, et al and U.S. Pat. No. 8,677,878 B1, M. Floyd, et al. all of which are incorporated herein by reference.

U.S. patent application Ser. No. 13/916,176 details the operation of a conventional propellant gun in combination with an electromagnetic coilgun to launch projectiles to hypervelocity using a single gun barrel. In U.S. Pat. No. 8,677,878 B1, the heat ordinarily produced by the coil stages is reduced by recovering and storing excess electromagnetic energy to be used on a subsequent shot; thus allowing for improved efficiency and reduced delay between firings.

There exists a demand for guns to be able to propel projectiles to higher velocity. Such projectiles are able to travel a greater distance, have reduced time of flight so that maneuvering targets can be engaged with higher hit probability, and can provide greater lethal effects on struck targets. High velocity is obtained by accelerating a projectile in two phases using the hybrid approach of the invention; the first phase uses propellants and a second phase uses electromagnetic energy. A gun system of the invention uses propellant to generate electrical energy in a separate auxiliary barrel acting as an electrical generator and applies that energy to further accelerate the projectile already in motion in the main barrel. Prior propellant gun state-of-art technology alone cannot accelerate projectiles to hypervelocity. Prior coil gun state-of-art technology could, in principal, launch projectiles to hypervelocity but only with undue burdens of large, heavy, and bulky external electrical power supplies. In addition, recharging such electrical storage devices requires additional machinery and undue amounts of time, which can substantially reduce firing rates. Use of coil gun technology has not been implemented in weaponry because of the logistics associated with power sources and the extremely large energy storage system needed to power sizable and effective projectiles to hypervelocity. In addition to inability to launch projectiles at hypervelocity, conventional guns produce large flash and blast signatures when fired and therefore give away the gun position and create hazardous conditions for the gun-firing crew.

The present invention overcomes many of these drawbacks. The hybrid gun uses propellant entirely as the energy source so that large external power supplies are not required. The propellant is applied in similar manner as conventional guns and can be reloaded rapidly to maintain firing rates. The invention accelerates the projectile in two phases using conventional propellants for the first phase and electromagnetic energy in the second phase. The electromagnetic coil system can be more efficient in the second phase since it acts on a moving projectile produced by conventional propellant in the first phase. By the end of the first phase, the projectile has acquired all of the kinetic energy afforded by the propellant combustion and thus combustion product gases are vented at that point in the two-phase acceleration process. The early venting of gases reduces the peak blast pressure as the projectile exits the muzzle and therefore is less hazardous to the gun crew. The number of coil stages needed for the hybrid gun to accelerate a projectile to a given hypervelocity is greatly reduced as compared with a coilgun producing that same velocity from a projectile initially at rest. The invention uses firing procedures similar to conventional gun technology using propellants, while the electromagnetic aspect can be made transparent or secondary to gun operations. Therefore, development of the invention is straightforward and can more easily be implemented in weapons.

Any and all of the aforementioned techniques can be combined into a single gun system to produce a safer, more efficient gun that fires a projectile to a greater range, delivers a projectile having higher hit probability, and produces a projectile with more lethality due to higher velocity. The hybrid gun can be applied to various scenarios where guns are employed. Within the scope of the present invention, the auxiliary barrel can be detached as a separate auxiliary gun and located at some distance from the main gun as an electrical generator. In such case, a separate cartridge case and igniter would be used with an igniter unit to fire the main gun and the auxiliary gun at the same time. Electrical cables would be used to connect coil stages of the generator gun to the coils of the main gun. Such configuration could allow the main gun to be slewed more easily since the mass of the main gun without the attached auxiliary barrel is reduced. Coilguns have been designed and built from small hobbyist sizes to 50 mm diameter of the referenced Sandia coilgun. Both conventional propellant gun technology and coil gun technology may operate at any scale. Thus, hybrid guns of the invention can be scaled to various sizes and can be developed for military equipment. This range of size includes small arms, howitzers, and large Naval guns. In that regard, there is no foreseen limit of application. In total, therefore, the invention has advantages in terms of utility, costs, and performance over prior art coilgun, railgun, or conventional approaches.

The present invention provides a gun system that includes the following components: 1) a main barrel; 2) an auxiliary barrel; 3) acceleration coil stages toward the end of the main barrel; 4) decelerating coil stages along the auxiliary barrel; 5) a breech for the main barrel with passageway to the breech of the auxiliary barrel; 6) an external low-level electrical source of energy; 7) control and switching networks to apply current generated by the auxiliary barrel to the coil sets of the main barrel; 8) a driver mass within the auxiliary barrel; 9) a projectile within the main barrel, and 10) a cartridge case containing conventional propellant.

The present invention provides a hybrid gun that integrates conventional propellant gun technology with coil gun technology.

The present invention allows a projectile to be fired at hypervelocity to extend range, provide accuracy, and act more effectively on a target.

The present invention provides greater efficiency in converting kinetic energy to electrical energy and electrical energy to kinetic energy.

The present invention provides means to use conventional propellants as the sole energy or power source to achieve hypervelocity.

The present invention provides means for reducing muzzle flash and muzzle blast to reduce gun exposure and environmental hazards acting on gun crews during firing.

DETAILED DESCRIPTION OF THE INVENTION

The basic components of a hybrid gun device for launching projectiles according to the invention are shown in FIGS. 1-4. The device includes a main barrel with breech, auxiliary barrel with breech, cartridge case of propellant, driver mass, projectile, deceleration and acceleration coils stages, an electrical switching network, and an external electrical source unit to supply a starting current for the coil stages along the auxiliary barrel.

Figure 6:
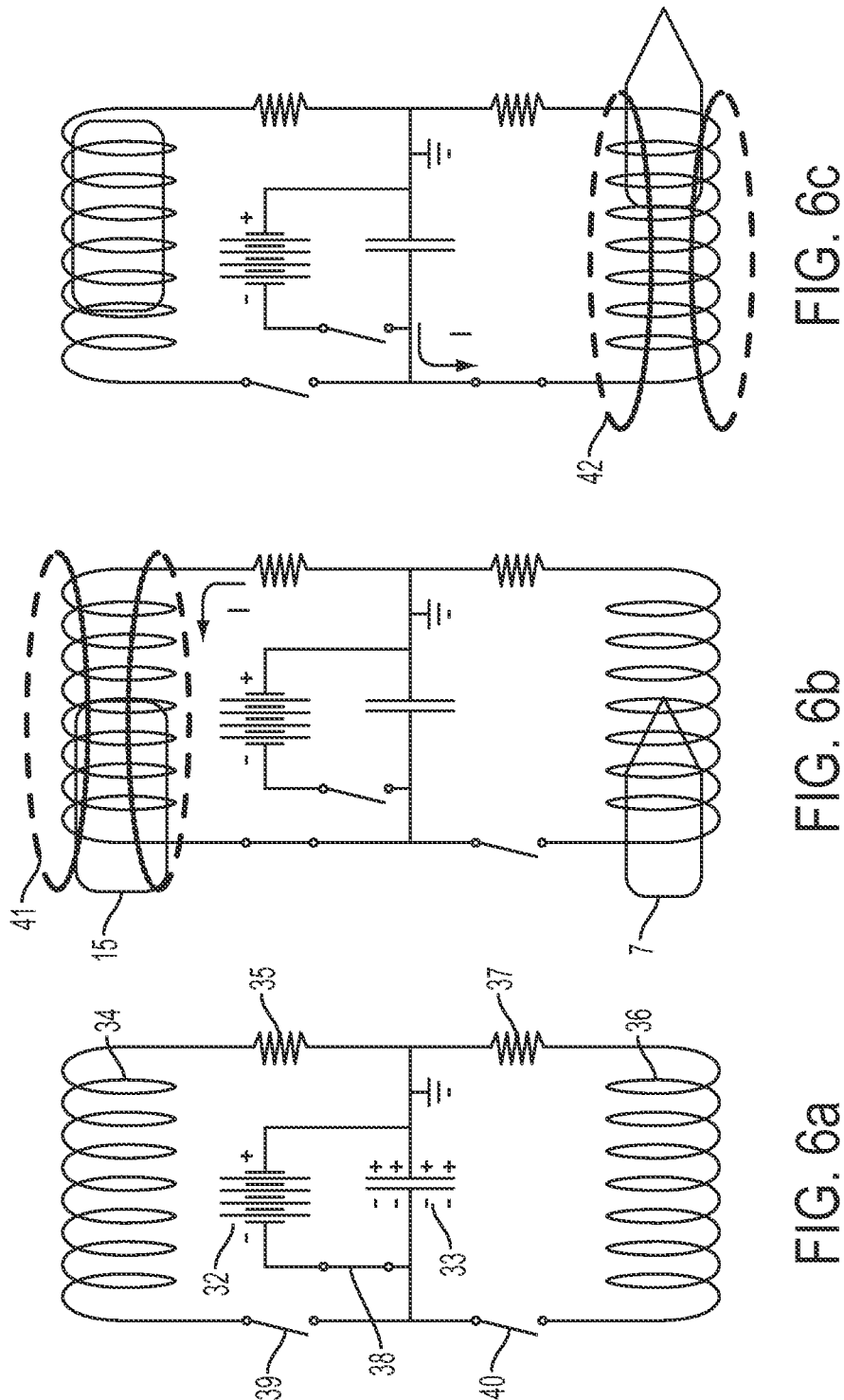
FIGS. 6a to 6c show the operating sequence of an exemplary coil circuit according to the invention, which acts to supply current to the acceleration coils.

As shown, the main gun portion of the system has a main barrel 1, a breech section 2 that houses the main barrel 1, a breechblock 3, a main barrel hollow core, or bore, 4 open at both ends, and a main barrel extension 5. The hollowed volume of the breech section 2 is filled with propellant 6. The main barrel breech 2 contains a projectile 7. Surrounding main barrel extension 5 are acceleration coil stages 8 and projectile position sensors 52. In addition, connected to the breech section 2 is an auxiliary breech section 9 to which auxiliary gun barrel 10 is attached. Auxiliary barrel 10 contains an auxiliary barrel hollow core, or core, 11 closed at its distal, or outlet, end. Attached to the end of the auxiliary barrel 10 is an auxiliary barrel extension 12 that contains a residual velocity absorber 13. The auxiliary barrel extension 12 is equipped with vent slots 14. Auxiliary barrel 10 contains driver mass 15 and driver positioning detent 16. The auxiliary barrel extension 12 has attached deceleration coil stages 17 and driver position sensors 51. The main barrel breech 2 and auxiliary breech 9 have an internal orifice 18 that leads from the barrel breech 2 to the interior hollow of auxiliary breech 9. Main barrel 1 and main barrel extension 5 are connected by barrel collar 19. Each coil 17 is coupled to a respective coil 8, as shown in FIG. 6.

Auxiliary barrel 10 and auxiliary barrel extension 12 are also connected by barrel collar 19, which simply maintains the desired positioning between the barrels. Barrel collar 19 also connects main barrel 1 to auxiliary barrel 10. Main barrel 1 and main barrel extension 5 may not have the same diameter and length as auxiliary barrel 10 and auxiliary barrel extension 12. The main barrel 1 contains venting slots 50 for venting of gaseous products associated with combustion of propellant 6.

Figure 1:
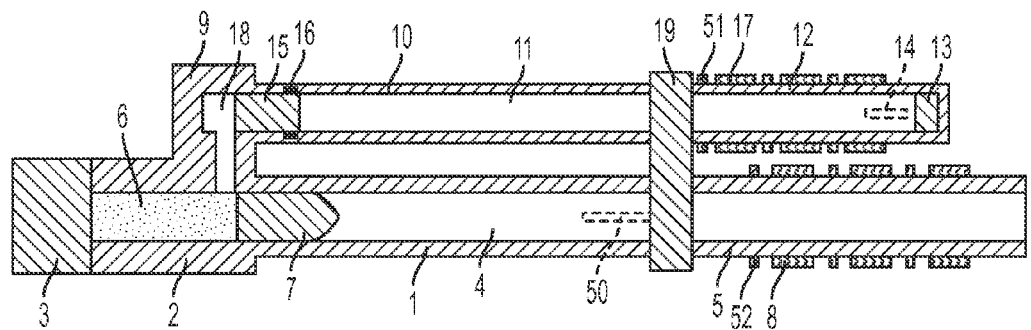
FIG. 1 is a longitudinal-sectional view of one embodiment of the invention, which will be housed in a suitable gun mount.
Figure 2:
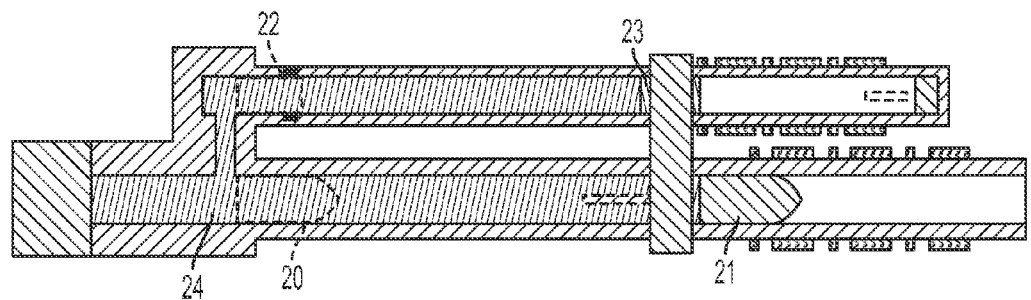
FIG. 2 is a first longitudinal-sectional view of the embodiment of the invention as illustrated in FIG. 1, which illustrates driver deceleration and projectile acceleration during firing of the gun.
Figure 3:
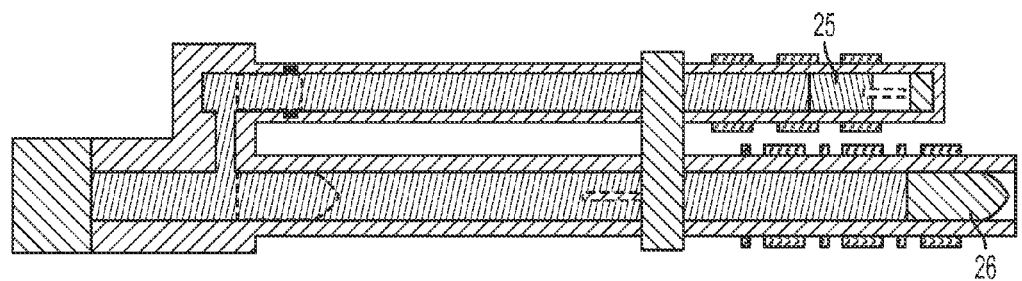
FIG. 3 is a second longitudinal-sectional view of the embodiment of the invention as illustrated in FIG. 1, which illustrates driver deceleration and projectile acceleration during firing of the gun.

Detent 16 is a semi-locking mechanism to hold the driver in place initially when the chamber has no pressure in it. It basically is at least one thin solid body (two are shown in FIG. 1) having parallel opposed sides and shaped at the side facing radially inwardly, the detent surface, to facilitate retention of driver 15 at the proximal, or rear, end of barrel 10. The, or each, detent slides radially in a cavity of mating size cut into the gun breech. Its narrow length extends along the longitudinal axis of barrel 10. According to one embodiment, its radial dimension may be 8 times its narrow length and its circumferential dimension may be 4 times its narrow length. There may be several such detents located about the gun barrel circumference.

The, or each, detent 16 can move only in the radial direction. The, or each, cavity receiving a detent 16 contains a coil spring (not shown) whose coil axis is radial. The spring bears against the radially outwardly facing side of detent 16 to urge the detent radially inwardly. The cavity may have a depth about equal to one-half the radial dimension of the detent to seat the detent into the cavity. When retained by detent(s) 16, driver 15 is not free to move down the gun barrel.

However, a small taper is placed on the half of the detent surface that faces the breech end of the barrel. When combustion pressure acts on the base of driver 15, significant pressure must build up before the component of force acting on the detent due to the inclination of the tapered surface in the outward radial direction can overcome the spring force and allow the force due to pressure to move the detent(s) outward radially, thus freeing the driver to move longitudinally under the effect of the pressure from the propellant combustion. After the driver leaves the vicinity of the detent(s) and after propellant gases have left the barrel, the detent(s) will move inward due to the force of the spring.

To return the driver(s) to the initial position (shown in FIG. 1) requires a means to lift the detent. One method could be to place a taper on the detent surface that faces the muzzle end of the barrel so that the driver's motion upon return will impact that tapered surface with sufficient force to retract the detent and allow the driver(s) to return to its starting position. With the driver(s) in starting position, the force of the spring moves the detent into a groove that may be cut in the driver body.

In operation, propellant 6 is ignited and upon combustion creates high pressure within the hollow of main breech 2 and orifice 18. The combustion pressure is applied to the base of projectile 7 and to driver 15, which accelerates projectile 7 in main barrel hollow core 4 and driver 15 in auxiliary barrel hollow core 11. Pressure produced by combustion of propellant 6 is sufficient to overcome semi-locking detent 16. As projectile 7 moves from initial position 20 to intermediate position 21 and driver 15 moves from position 22 to position 23, combustion of propellant 6 produces gases 24 that fill main barrel hollow core 4 and auxiliary barrel hollow core 11 up to the base of projectile 7 and the base of driver 15. When projectile 7 reaches position 21 and driver 15 reaches position 23, the acceleration phase of projectile 7 and driver 15 due to combustion of propellant 6 comes to an end. As projectile 7 passes by venting slots 50, combustion gases 24 are released to the region surrounding the gun system.

With completion of the first acceleration phase by propellant gases 24, projectile 7 at projectile position 21 approaches the vicinity of main barrel coil stages 8 located along main barrel extension 5, where a second phase of projectile acceleration begins. Also, driver 15 located at position 23 reaches the vicinity of auxiliary barrel coil stages 17 along auxiliary barrel extension 12 where deceleration of driver 15 begins.

Driver 15 decelerates as it passes through auxiliary coil stages 17 and arrives at near zero velocity at driver position 25. Should any small residual velocity of driver 15 exist at driver position 25, residual velocity absorber 13 acts to bring driver 15 to rest. Ambient air that initially filled hollow core 11 ahead of driver 15 is vented through vent slots 14 as driver 15 moves to position 25. Deceleration of driver 15 in auxiliary barrel coil stages 17 generates electrical energy that is sequentially applied to main barrel coil stages 8. Projectile 7, passing through main barrel coil stages 8 to projectile position 26, is accelerated by main barrel coils stages 8 to a velocity beyond that acquired at projectile position 21. The projectile acceleration taking place within the final stage or stages of coil stages 8 can be altered by changing applied current so that a velocity correction is made to projectile 7.

After projectile 7 exits main barrel extension 5, residual propellant gases 24 that have not been vented by venting slots 50 can exit the muzzle of main barrel extension 5. Exit of propellant gases 24 through venting slots 19 and the muzzle of main barrel extension 5 ultimately reduces pressure in main barrel hollow core 4 and auxiliary barrel hollow core 11 to ambient conditions.

A small reversed electrical current applied to auxiliary coil stages 17 provides a restoring force that moves driver 15 from driver position 25 back to the initial position 22 of driver 15 in advance of the next shot.

An alternate means of restoring driver 15 to position 22 uses a small amount of stored gases from propellant gases 24 that are subsequently injected into space between driver position 25 and absorber 13 together with a means for temporarily closing vent slots 14. Breechblock 3 is opened and a new projectile 7 and charge of propellant 6 is loaded into the main barrel breech 2. Breechblock 3 is closed and propellant 6 is ready to be ignited for another shot.

Figure 4:
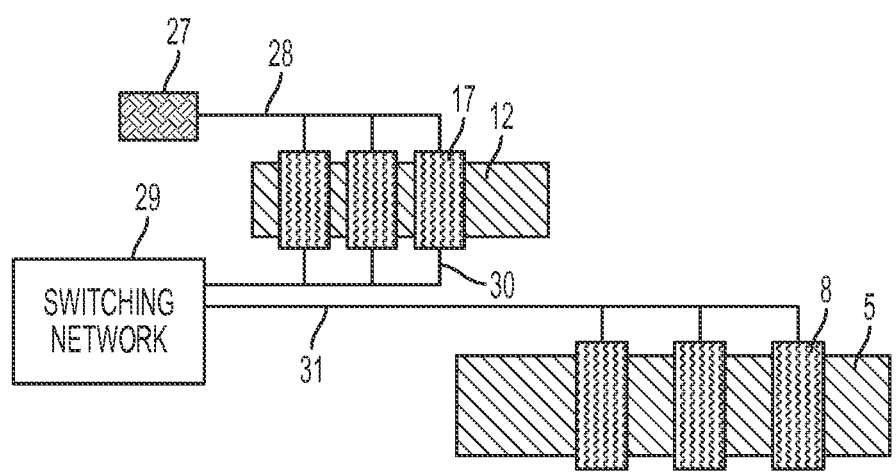
FIG. 4 is a schematic view of the electrical components according to the invention, which will be housed in a suitable position adjacent to the gun.

Referring to FIG. 4, external low-level power source 27 connects electrically and conductively to deceleration coil stages 17 through source cable 28. Deceleration coil stages 17 connect to switching network 29 through power cable 30 while electrical output from switching network 29 connects to acceleration coil stages 8 through output cable 31. Source cable 28, power cable 30, and output cable 31 may contain multiple wires such that power source 27 and switching network 29 can supply sequenced electrical pulses to decelerator coil stages 17 and accelerator coil stages 8.

Figure 5:
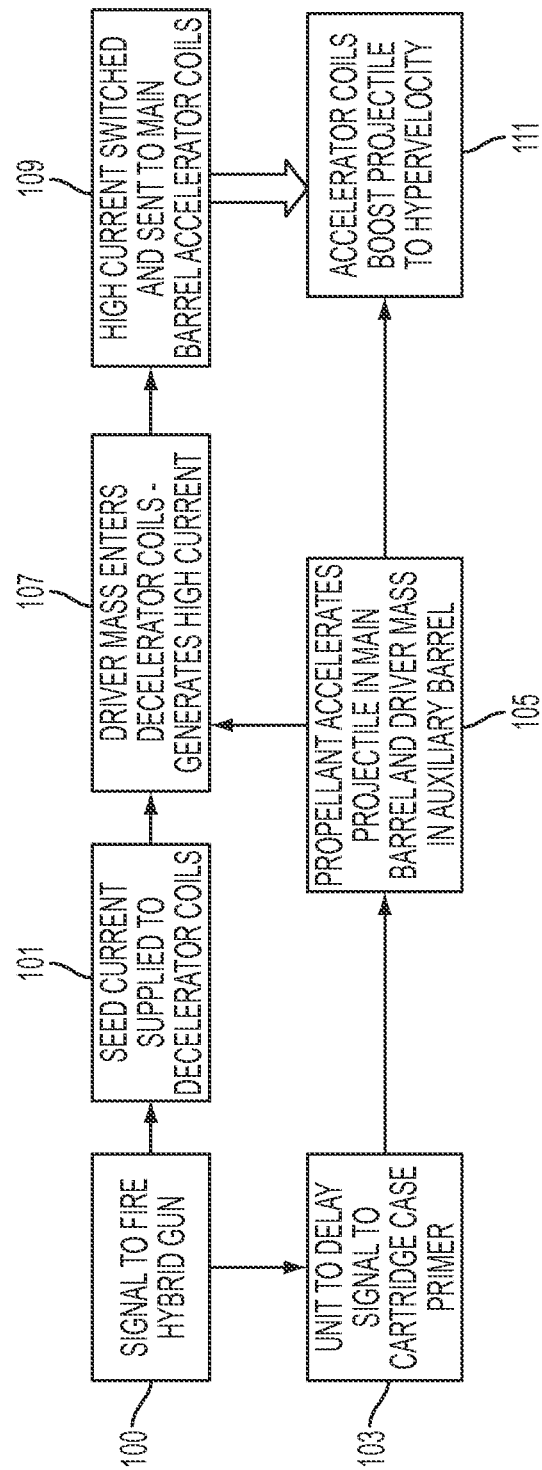
FIG. 5 is a schematic of propellant action and electrical functions according to the invention.

FIG. 5 shows a schematic of propellant action and electrical functions that take place sequentially during gun firing. At 100, the signal to fire the gun is produced and acts to initate, at 101, supply of a seed current to the decelerator coil of at least the first coil set initiate, at 103, delay of an ignition signal to the projectile cartridge case primer. At 105 the propellant is ignited and the projectile receives its initial acceleration. At 107, the driver interacts with successive decelerator coils. At 109, high current is sent to each successive accelerator coil and, at 111, the projectile undergoes successive supplemental accelerations.

FIG. 6 give one example of a circuit that produces electrical pulses to accelerate projectile 7. The circuit is comprised of battery 32 representing power source 27, capacitor 33, a single decelerator coil represented by decelerator inductor 34, decelerator coil resistance as decelerator coil resistor 35, a single accelerator coil given as accelerator coil inductor 36, and an accelerator coil resistance represented by accelerator resistor 37. Circuit switches include power switch 38, decelerator coil switch 39, and accelerator coil switch 40. Coil 34 corresponds to coil 17 and coil 36 corresponds to coil 8.

In operation, as shown in FIG. 6a, capacitor 33 is electrically charged from battery 32 when initially open switch 38 is subsequently closed forming an initial circuit that contains only the battery 32 and capacitor 33. Switch 39 and switch 40 are open to prevent current from flowing in the remainder of the circuit during the time taken to fully charge capacitor 33.

Then, as shown in FIG. 6b, after capacitor 33 is sufficiently charged, switch 38 is opened while switch 39 is closed, which creates an intermediate circuit that includes capacitor 33, inductor 34, and resistor 35. In this circuit state, electrical current is discharged from capacitor 33 into decelerator coil inductor 34 and decelerator coil resistor 35. Current flow through decelerator coil inductor 34 establishes a magnetic field 41 within the decelerator coil inductor 34. As driver 15 enters decelerator coil inductor 34, circuit inductance is reduced, driver 15 is decelerated, and the current rises, which flows back into capacitor 33 producing a high level of energy stored in capacitor 33. Direction of current flow within the decelerator coil inductor 34, the established magnetic field 41, and current induced in metallic driver 15 develop decelerating forces that act on driver 15.

Then, as shown in FIG. 6c, after an increment of velocity is lost from the driver by entering decelerator coil 36, a final circuit state is established that connects capacitor 33 with accelerator coil inductor 36 and accelerator coil resistor 37 by closing switch 41 and opening switch 39. Current flow through the accelerator coil inductor 36 develops a magnetic field 42 within accelerator coil inductor 36. The direction of current flow in the final circuit, direction of magnetic field 42 and induced current in the projectile 7 develops accelerating forces acting on projectile 7. After initial, intermediate, and final circuits complete assigned functions, all switches are returned to positions of the initial circuit in advance of the next shot.

Exemplary materials for the above described components may include conducting metals such as copper or aluminum for projectile 7, driver 15, wires for inductor 34 and inductor 37. The projectile 7 may have an outer sheath of high conductivity metal to accommodate induced currents. Main barrel 1, main barrel breech 2, auxiliary barrel breech 9, auxiliary barrel 10, breechblock 3, and collar 19 are composed gun barrel steel or other high strength metal, while main barrel extension 5 and auxiliary barrel extension 12 are composed high strength wound glass or carbon filament composites or other material transparent to magnetic fields.

Electrical components to include cables, circuitry, and coils use high conductivity metals such as copper. The absorber 13 is composed of spring steel or suitable energy absorbing material. Propellant 6 can be of any suitable type known to those skilled in the art.

Figure 7:
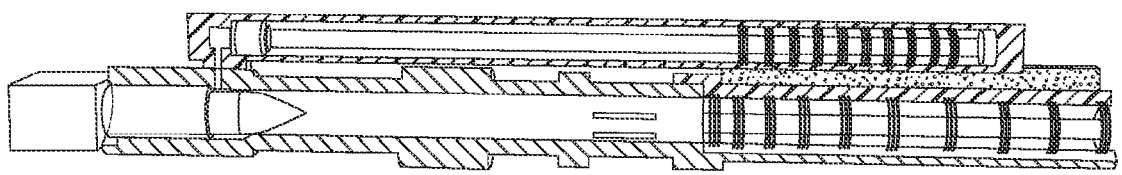
FIG. 7 is a pictorial showing one form of construction of components according to the present invention.

FIG. 7 is essentially a pictorial view of an exemplary embodiment of the invention equipped with, by way of example, 10 coil sets. This embodiment will be operated in the manner disclosed herein with reference to the other figures.

Figure 8:
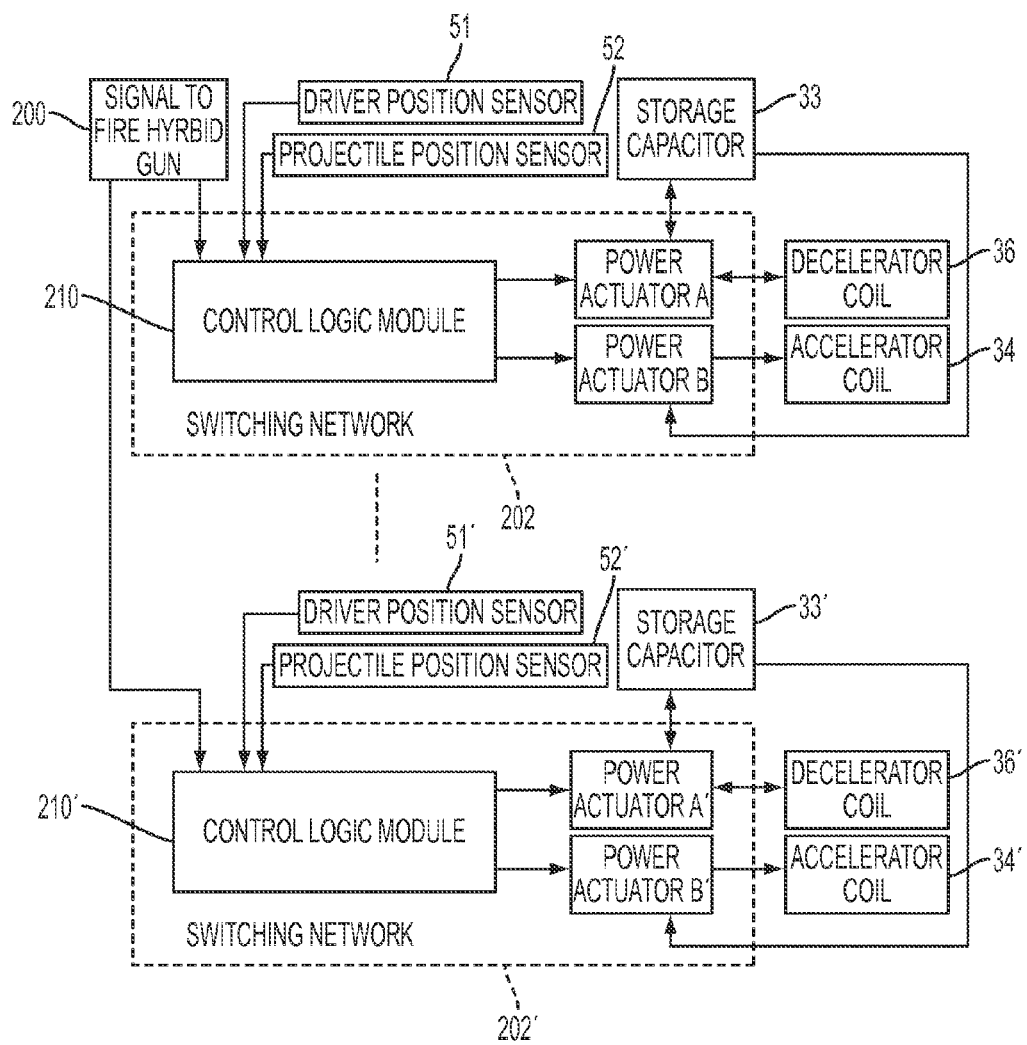
FIG. 8 is a diagram of one exemplary embodiment of circuitry for operating a hybrid gun device according to the invention.

FIG. 8 illustrates one example of circuitry for operating a hybrid gun device according to the invention. This is composed essentially of a component 200 that produces a signal to fire the gun, typically in response to actuation of a trigger mechanism, and a plurality of circuit units, each connected to control a respective one of the coil sets that are spaced apart along the barrels.

Each circuit unit is composed of a switching network 202, 202', driver position sensor 51, 51', and projectile position sensor 52, 52'. Each network 202, 202' contains a respective control logic module 210, 210', a respective power actuator A, A', and a respective power actuator B, B'. Each actuator A contains switches 38 and 39 (FIG. 6) and each actuator B contains switch 40 of its associated coil set.

While FIG. 8 shows two circuit units, it will be understood embodiments of the invention will have a number of circuit units equal to the number of coil sets with which the gun is equipped, one circuit unit for each coil set.

Each circuit unit is constructed to route current to the respective decelerator coil and accelerator coil at proper times.

A respective driver position sensor 51 is located near each decelerator coil stage along auxiliary barrel extension 12 and a respective projectile position sensor 52 is located near each acceleration coil stage along barrel extension 5. Sensors 51 and 52 are located upstream of their associated coils. Each storage capacitor 33, 33' may be located on or near to the hybrid gun system with suitable electrical cables connecting to power actuators A and B, deceleration coils 34, and acceleration coils 36.

Each control logic module is composed of multiple transistors connected respectively to the firing unit and position sensors 51 and 52 such that signals received from the sensors cause the transistors to apply current to respective solenoids, which actuate switches 38, 39, 40, in the desired sequence.

In operation, a signal to fire the gun is sent from component 200 to the control logic modules, which in turn instruct power actuator A to close switch 38 of each coil set to connect the storage capacitor to an outside low-level power source representing battery 32.

This action charges storage capacitors 33 initially.

As driver 15 approaches a deceleration coil 34, a signal is sent by the driver position sensor 52 to the control logic module to open switch 38 within the power actuator A to the outside power source and close switch 39 within the power actuator A to connect the storage capacitor 33 to decelerator coil 34. This action applies seed current to the decelerator coil 34 and creates magnetic field 41 that retards the moving driver 15 and generates a high level of current.

Subsequently, the generated current flows back into storage capacitor 33 since switch 39 between decelerator coil 34 and the capacitor 33 is closed. After storage capacitor 33 has received nearly all the charge generated by the passage of driver 15 through decelerator coil 34, the control logic module instructs power actuator A to disconnect the storage capacitor from decelerator coil 34, i.e., to open switch 39.

As projectile 7 reaches the proper position with respect to accelerator coil 36, projectile position sensor 51 sends a signal to the control logic module to instruct actuator B to connect the storage capacitor to accelerator coil 36, by closing switch 40. Flow of current from the storage capacitor through accelerator coil 36 creates magnetic field 42 that accelerates projectile 7.

After a suitable delay, the control logic module may require that switch 40 connecting storage capacitor 33 to acceleration coil 36 be opened at a time when storage capacitor 33 retains a small amount of charge to provide seed current to the next coil stage through the power actuator A of the next coil stage, for example. This will be explained more fully below in the description of the embodiment shown in FIG. 9.

The process of alternately charging the storage capacitor by decelerator coils, and in turn having the storage capacitor supply current to accelerator coils, is repeated sequentially from the first coil stage to successive coil stages wherein driver 15 undergoes successive decelerations and projectile 7 undergoes successive accelerations.

Control logic module 210, 210' is an electronic device powered by a low-level power source represented by battery 32 that supplies power to the power actuators A and B when instructed to do so. The control logic module consists of many three-terminal transistors that can produce output current on two output terminals in response to a voltage change placed on the third terminal. The driver position sensor 51 and projectile position sensor 52 provide the voltage change when the driver 15 or projectile 7 passes by the respective sensor. The manner of constructing the control logic modules will be readily apparent to those skilled in the art.

Sensors 51 and 52 may each consist typically of a single or few turn coil wound about the barrels, or Rogowski coils, located at appropriate positions along the auxiliary barrel extension 12 or barrel extension 5, respectively. The two transistor output terminals are connected to a solenoid within power actuator A or B that powers a mechanical switch that corresponds to switches 38, 39, 40. The mechanical switch connects the storage capacitor 33 to battery 32, deceleration coil 34, or acceleration coil 36 at appropriate times. When the transistor produces no output current, a particular switch remains in the open position and therefore does not connect any of the indicated components. When the transistor produces output current, a particular switch within the power actuator is closed to connect the storage capacitor 33 to one of the discussed components. The number of such transistors required includes one for the switch connecting battery 32 to capacitor 33, and corresponding others to connect the storage capacitor 33 to decelerator coil 34 and accelerator 36 coil that are included in the system.

Figure 9:
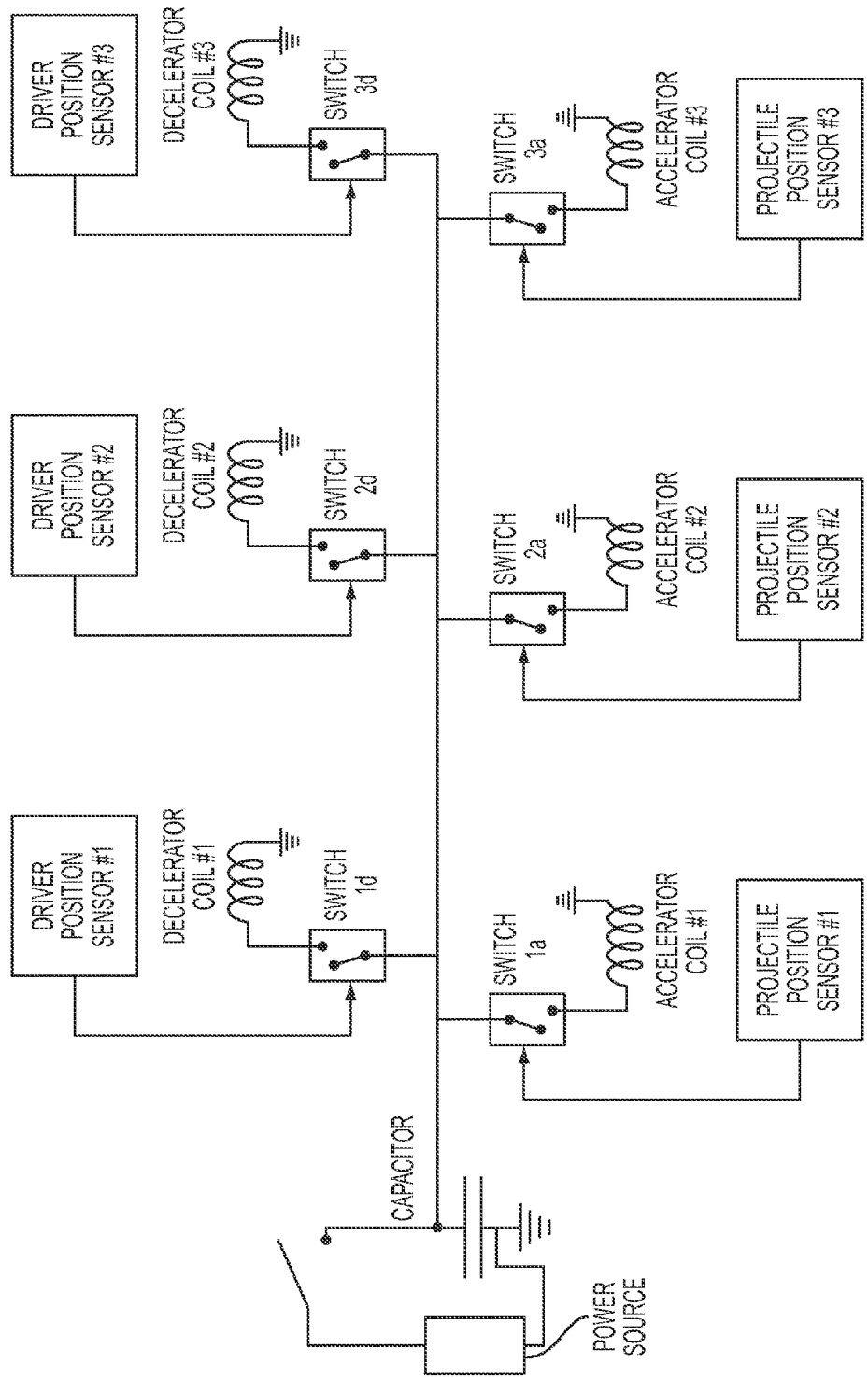
FIG. 9 is a circuit diagram of a circuit embodiment of the invention associated with three coil sets.

FIG. 9 shows a variant of the circuitry for controlling the coil sets. Three coil sets are shown with the switches to send current to and from the three decelerator coils and to three switches to send current to the accelerator coils. Switching may be controlled by circuitry of FIG. 8, except that only one capacitor will be provided to send seed current to each decelerator coil in sequence.

Driver position sensors #1, #2 and #3 correspond to sensors 51, projectile position sensors #1, #2 and #3 correspond to sensors 52, decelerator coils #1, #2 and #3 correspond to coils 34 accelerator coils #1, #2 and #3 correspond to coils 36, switches 1*d*, 2*d*, 3*d* correspond to switches 39 and switches 1*d*, 2*d*, 3*d* correspond to switches 39 and switches 1*a*, 2*a*, 3*a* correspond to switches 40.

Each coil set and its associated switches are controlled by a respective set of position sensors.

Initially, all switches are open. Then, the capacitor is charged, as shown in FIGS. 6 and 9 and as previously described, by closing the switch provided between the power source and the capacitor upon production of a signal to fire the gun. During function of each of the coil sets, only one switch is closed at a time and each coil set is operated independently.

To start a switching network, driver 16 approaches decelerator coil #1. Driver position sensor #1 senses that the driver is about to pass through decelerator coil #1, in response to which a signal is sent, e.g., from power actuator A in FIG. 8, to close switch 1d to supply power from the capacitor to decelerator coil #1 to initially energize the coil and create a low-level magnetic field.

As driver 15 passes through decelerator coil #1, a large current is developed in decelerator coil #1 that passes through closed switch 1d to the capacitor to recharge the capacitor, now to a very high level of electrical charge.

After that, switch 1d is opened, and the capacitor is not connected to anything.

Then projectile position sensor #1 senses that the projectile is in the proper position relative to accelerator coil #1 to begin the projectile acceleration process. At that point the projectile position sensor #1 produces a sensing signal to the associated actuator (e.g., power actuator B in FIG. 8) to send power to the solenoid of switch 1a to close switch 1a. Now, only accelerator coil #1 is connected to the capacitor. The capacitor can now send the stored energy to accelerator coil #1, which creates a high intensity magnetic field within accelerator coil #1 to accelerate the projectile.

After the projectile has been accelerated, but before all energy has been drained from the capacitor, switch 1a is opened under control of the associated power actuator.

Now all switches are open so the capacitor is not connected to anything.

Shortly thereafter, driver position sensor #2 senses that the driver is now close to decelerator coil #2 and thus sends a signal to cause the associated power actuator (e.g., power actuator A' in FIG. 8) to close switch 2d. With switch #2d closed, the capacitor furnishes seed current to decelerator coil #2 to create a low-level magnetic field in preparation for generation of high current in decelerator coil #2 as the driver passes therethrough. That high level current flows back into the capacitor since it is connected to decelerator coil #2 by switch 2d. Once the driver and decelerator coil #2 have completed the storing of high energy in the capacitor, switch 2d is opened so that nothing is connected to the capacitor at this point.

Meanwhile projectile position sensor #2 senses that the projectile has advanced to the proper position relative to accelerator coil #2, to be accelerated. Thus, projectile position sensor #2 signals the associated power actuator (e.g., power actuator B' in FIG. 8) to close switch 2a. Closing of switch 2a applies current to accelerator coil #2 and the projectile receives another increment of acceleration. Before all the energy is dumped from the capacitor, switch 2a is opened so that some residual change remains to provide seed current to decelerator coil #3. The entire process is repeated for each coil set in the system.

While the description above refers to particular embodiments of the present invention, it will be understood that many modifications may be made without departing from the spirit thereof. For example, multiple coils are used to improve efficiency of the electro-mechanical system and as such many coil sets can be used beyond the three stages shown herein. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

REFERENCES

1. "Design and Performance of Sandia's Contactless Coilgun for 50 mm Projectiles," IEEE Transactions on Magnetics, Vol. 29, No 1, p. 680, January 1993, R. J. Kaye et al.
2. "Hypervelocity Projectile Launching System," U.S. patent application Ser. No. 13/916,176, 14 Jun. 2013, F. I. Grace et al.
3. Army (February 1965), Interior Ballistics of Guns, Engineering Design Handbook: Ballistics Series, United States Army Material Command, AMCP 706-150.
4. Wikipedia.org/wiki/light_gas_gun: Light Gas Gun: Design Physics, 2013.
5. Army Times: EM technology could revolutionize the mortar, 2011.
6. "Thermal management of a propulsion circuit in an electromagnetic munition launcher," U.S. Pat. No. 8,677,878 B1, March 2014, M Floyd, et al.
7. "SLINGSHOT—A Coilgun Design Code," Sandia National Laboratories Report, SAND2001-1780, B, M, Marder, 2001.
8. "EM Mortar Technology Development for Indirect Fire," SAND ADA481646, B. N. Thurman et al, 1 Nov. 2006.

What is claimed is:

1. A hybrid gun for firing a projectile that is at least partly electrically conductive, said gun comprising:
   a main gun portion having a proximal end and a distal end, and a first longitudinal bore extending between said ends and open at both ends, for receiving the projectile,
   an auxiliary gun portion having a proximal end and a distal end, and a second longitudinal bore extending between said ends, open at said proximal end and closed at said distal end;
   a driver body of electrically conductive material installed in, and movable along, said second longitudinal bore, said driver body being normally retained at said proximal end of said auxiliary gun portion;
   a breech block enclosing a space for containing a propellant and communicating with said proximal ends of said first and second longitudinal bores; and
   an electromagnetic energy transfer circuit coupled between said auxiliary gun portion and said main gun portion and including inductors that transfer kinetic energy from said driver body to the projectile following detonation of the propellant.

2. The hybrid gun of claim 1, wherein each of said gun portions comprises a respective barrel part along which said electromagnetic energy transfer circuit is disposed, said respective barrel parts being made of a material that is substantially transparent to electromagnetic radiation.

3. The hybrid gun of claim 2, wherein said material that is substantially transparent to electromagnetic radiation is a dielectric material.

4. The hybrid gun of claim 3, wherein said dielectric material is a carbon composite material.

5. The hybrid gun of claim 1, wherein each said gun portion comprises a main barrel part and an extension barrel part, said second barrel part of each said gun portion being made of a material that is substantially transparent to electromagnetic radiation.

6. The hybrid gun of claim 5, wherein said material that is substantially transparent to electromagnetic radiation is a dielectric material.

7. The hybrid gun of claim 5, wherein said dielectric material is a carbon composite material.

8. The hybrid gun of claim 5, wherein said electromagnetic energy transfer circuit comprises at least one pair of coils including a decelerator coil positioned along said extension barrel part of said auxiliary gun portion, and an accelerator coil positioned along said extension barrel part of said main gun portion.

9. The hybrid gun of claim 8, wherein said electromagnetic energy transfer circuit further comprises a current source connectable to said decelerator coil to supply a seed current to said decelerator coil.

10. The hybrid gun of claim 9, wherein said electromagnetic energy transfer circuit further comprises a switching network connected to said coils and having a first switching state in which the seed current is supplied to said decelerator coil and a second switching state in which said coils are connected together in series.

11. The hybrid gun of claim 5, further comprising a detent element in said bore of said auxiliary gun component that temporarily holds said driver body at said proximal end of said auxiliary gun portion.

12. The hybrid gun of claim 1, wherein said electromagnetic energy transfer circuit comprises at least one pair of coils including a decelerator coil positioned along said extension barrel part of said auxiliary gun portion, and an accelerator coil positioned along said extension barrel part of said main gun portion.

13. The hybrid gun of claim 12, wherein said electromagnetic energy transfer circuit further comprises a current source connectable to said decelerator coil to supply a seed current to said decelerator coil.

14. The hybrid gun of claim 13, wherein said electromagnetic energy transfer circuit further comprises a switching network connected to said coils and having a first switching state in which the seed current is supplied to said decelerator coil and a second switching state in which said coils are connected together in series.

15. The hybrid gun of claim 1, further comprising a detent element in said bore of said auxiliary gun component that temporarily holds said driver body at said proximal end of said auxiliary gun portion.

16. The hybrid gun of claim 15, wherein said main gun portion has a vent communicating with said bore to permit escape of propellant gas from said bore.

17. The hybrid gun of claim 1, wherein said main gun portion has a vent communicating with said bore to permit escape of propellant gas from said bore.

18. The hybrid gun of claim 1, further comprising a single body of propellant material disposed in said space enclosed by said breach block.

* * * * *